(12) United States Patent
Stevens

(10) Patent No.: US 11,570,508 B2
(45) Date of Patent: Jan. 31, 2023

(54) REPLACEMENT OF RECORDED MEDIA CONTENT

(71) Applicant: OpenTV, Inc., San Francisco, CA (US)

(72) Inventor: Charles Stevens, Mountain View, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 16/028,638

(22) Filed: Jul. 6, 2018

(65) Prior Publication Data

US 2019/0075352 A1 Mar. 7, 2019

Related U.S. Application Data

(63) Continuation of application No. 15/282,499, filed on Sep. 30, 2016, now Pat. No. 10,045,067.

(51) Int. Cl.
*H04N 5/76* (2006.01)
*H04N 9/88* (2006.01)
(Continued)

(52) U.S. Cl.
CPC ... *H04N 21/4335* (2013.01); *H04N 21/23109* (2013.01); *H04N 21/23439* (2013.01);
(Continued)

(58) Field of Classification Search
USPC ............... 386/291, 297, 292, 293, 294, 299
See application file for complete search history.

(56) References Cited

U.S. PATENT DOCUMENTS

| 7,209,632 B2 * | 4/2007 | Nono | H04N 5/44543 |
| | | | 348/180 |
| 7,720,358 B2 * | 5/2010 | Yokota | H04N 5/765 |
| | | | 348/725 |

(Continued)

FOREIGN PATENT DOCUMENTS

| CN | 1367926 A | 9/2002 |
| CN | 1856994 | 11/2006 |

(Continued)

OTHER PUBLICATIONS

"International Application Serial No. PCT US2017 049329, International Preliminary Report on Patentability dated Apr. 11, 2019", 9 pgs.

(Continued)

*Primary Examiner* — Daquan Zhao
(74) *Attorney, Agent, or Firm* — Schwegman Lundberg & Woessner, P.A.

(57) ABSTRACT

Example embodiments provide systems and methods for replacing recorded media content. In an example method, at least one media content source is searched for a media content item recorded to storage of a first media content device. Based on the media content item being found at a first media content source of the at least one media content source, a recording of the media content item to storage of a second media content device is scheduled based on the media content item being recordable from the first media content source at the second media content device. Based on the media content item not being recordable from the first media content source at the second media device, the availability of the media content item is indicated to the second media content device.

20 Claims, 8 Drawing Sheets

(51) Int. Cl.
| | |
|---|---|
| *H04N 21/4335* | (2011.01) |
| *H04N 21/658* | (2011.01) |
| *H04N 21/231* | (2011.01) |
| *H04N 21/2343* | (2011.01) |
| *H04N 21/4147* | (2011.01) |
| *H04N 21/426* | (2011.01) |
| *H04N 21/2665* | (2011.01) |
| *H04N 21/433* | (2011.01) |
| *H04N 21/435* | (2011.01) |
| *H04N 21/458* | (2011.01) |
| *H04N 21/482* | (2011.01) |
| *H04N 5/94* | (2006.01) |

(52) U.S. Cl.
CPC ..... *H04N 21/2665* (2013.01); *H04N 21/4147* (2013.01); *H04N 21/42684* (2013.01); *H04N 21/435* (2013.01); *H04N 21/4334* (2013.01); *H04N 21/458* (2013.01); *H04N 21/4828* (2013.01); *H04N 21/6581* (2013.01)

(56) References Cited

U.S. PATENT DOCUMENTS

| | | | |
|---|---|---|---|
| 10,045,067 B2 | 8/2018 | Stevens | |
| 2002/0042916 A1* | 4/2002 | Mineyama | G06F 3/0481 725/39 |
| 2002/0085311 A1 | 7/2002 | Wakahara | |
| 2004/0123319 A1* | 6/2004 | Kim | H04N 21/42212 725/53 |
| 2005/0160308 A1 | 7/2005 | Elcock et al. | |
| 2005/0204380 A1* | 9/2005 | Lee | H04N 21/2662 725/25 |
| 2007/0130203 A1* | 6/2007 | Gulli | G06F 7/00 707/104.1 |
| 2007/0220053 A1* | 9/2007 | Su | H04N 21/454 |
| 2008/0046406 A1* | 2/2008 | Seide | G06F 16/68 |
| 2008/0086688 A1* | 4/2008 | Chandratillake | G06F 16/739 715/719 |
| 2008/0162925 A1 | 7/2008 | Okaya | |
| 2009/0254966 A1 | 10/2009 | Josephs et al. | |
| 2010/0074589 A1* | 3/2010 | Dinallo | H04N 5/782 386/271 |
| 2013/0159324 A1* | 6/2013 | Xu | G06F 16/2471 707/754 |
| 2013/0312042 A1* | 11/2013 | Shaw | H04N 21/45455 725/62 |
| 2013/0326562 A1 | 12/2013 | Bi et al. | |
| 2014/0186001 A1* | 7/2014 | Aldrey | G06F 13/38 386/200 |
| 2015/0000201 A1 | 1/2015 | Belyaev et al. | |
| 2016/0066063 A1 | 3/2016 | Meuninck et al. | |
| 2017/0289621 A1* | 10/2017 | Martin | H04N 21/4821 |
| 2018/0098114 A1 | 4/2018 | Stevens | |

FOREIGN PATENT DOCUMENTS

| | | |
|---|---|---|
| CN | 102687507 A | 9/2012 |
| CN | 103959286 A | 7/2014 |
| CN | 109997366 A | 7/2019 |
| IN | 201917013683 A | 6/2019 |
| JP | 4346585 B2 | 7/2009 |
| WO | 2018063700 | 4/2018 |

OTHER PUBLICATIONS

"U.S. Appl. No. 15/282,499, Examiner Interview Summary dated Jan. 12, 2018", 3 pgs.
"U.S. Appl. No. 15/282,499, Non Final Office Action dated Oct. 3, 2017", 12 pgs.
"U.S. Appl. No. 15/282,499, Notice of Allowance dated Apr. 6, 2018", 5 pgs.
"U.S. Appl. No. 15/282,499, Response filed Feb. 5, 2018 to Non Final Office Action dated Oct. 3, 2017", 13 pgs.
"International Application Serial No. PCT/US2017/049329, International Search Report dated Nov. 8, 2017", 2 pgs.
"International Application Serial No. PCT/US2017/049329, Written Opinion dated Nov. 8, 2017", 7 pgs.
"Introducing X2: The Next Generation of Comcast's X1 Entertainment Operating System", Comcast, [Online], Retrieved from the Internet: <URL: http://corporate.comcast.com/news-information/news-feed/introducing-x2>, (Accessed: Jul. 8, 2016), 3 pgs.
"European Application Serial No. 17857127.9, Extended European Search Report dated Jun. 24, 2019", 6 pgs.
"European Application Serial No. 17857127.9, Response filed Jan. 21, 2020 to Extended European Search Report dated Jun. 24, 2019", 13 pages.
"European Application Serial No. 17857127.9, Communication Pursuant to Article 94(3) EPC dated Apr. 2, 2020", 4 pages.
"European Application Serial No. 17857127.9, Response filed Aug. 10, 2020 to Communication Pursuant to Article 94(3) EPC dated Apr. 2, 2020", 13 pgs.
"Chinese Application Serial No. 201780072559.7, Office Action dated Feb. 3, 2021", with English translation, 22 pages.
"European Application Serial No. 17857127.9, Summons to Attend Oral Proceedings mailed Jan. 14, 2021", 7 pgs.
"Chinese Application Serial No. 201780072559.7, Response filed May 24, 2021 to Office Action dated Feb. 3, 2021", with English claims, 14 pages.
"Indian Application Serial No. 201917013683, First Examination Report dated Sep. 1, 2021", with English translation, 6 pages.
"Chinese Application Serial No. 201780072559.7, Office Action dated Sep. 8, 2021", with English translation, 21 pages.
"Chinese Application Serial No. 201780072559.7, Response filed Nov. 23, 2021 to Office Action dated Sep. 8, 2021", with English claims, 52 pages.
"Chinese Application Serial No. 2017800725597, Decision of Rejection dated Feb. 15, 2022", with machine English translation, 19 pages.
"Indian Application Serial No. 201917013683, Response filed Feb. 22, 2022 to First Examination Report dated Sep. 1, 2021", 20 pgs.
U.S. Appl. No. 15/282,499 U.S. Pat. No. 10,045,067, filed Sep. 30, 2016, Replacement of Recorded Media Content.

* cited by examiner

| RECORDED MEDIA CONTENT IDENTIFIER DATABASE 204 | | | | |
|---|---|---|---|---|
| DEVICE ID 502 | RECORDED MEDIA CONTENT ITEM ID 504 | VERSION CODE 506 | REPLACEMENT STATUS 508 | REPLACEMENT SOURCE 510 |
| ⋮ | ⋮ | ⋮ | ⋮ | ⋮ |

FIG. 5

REPLACEMENT OF RECORDED MEDIA CONTENT

CLAIM OF PRIORITY

This application is a continuation of U.S. patent application Ser. No. 15/282,499, which is incorporated herein by reference in its entirety.

FIELD

The present disclosure relates generally to the presentation of media content and, in a specific example embodiment, to the replacement of recorded media content.

BACKGROUND

Television viewers have long employed digital video recorders (DVRs) (sometimes referred to as personal video recorders (PVRs)) to record and store programs for viewing at a later, more convenient time. Typically, such devices are either integrated within a television set-top box (STB) for receiving signals via a cable or satellite television distribution network, or utilized as a standalone unit.

Unlike older videocassette recorders (VCRs), which used a removable video tape cartridge as a recording medium, most DVRs employ a non-removable hard disk drive for program storage. Moreover, most DVRs do not possess the ability to offload the programs stored therein to an external storage medium. Consequently, when the DVR is no longer in service, such as when the DVR or associated STB fails, or when the DVR or STB is a replaced with a different (e.g., newer) model, all recorded programs stored on the DVR typically become inaccessible to the viewer.

BRIEF DESCRIPTION OF DRAWINGS

Various ones of the appended drawings merely illustrate example embodiments of the present disclosure and cannot be considered as limiting in scope.

FIG. 5 is a graphical depiction of an example recorded media content identifier database employed in the example media content replacement system of FIG. 2.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
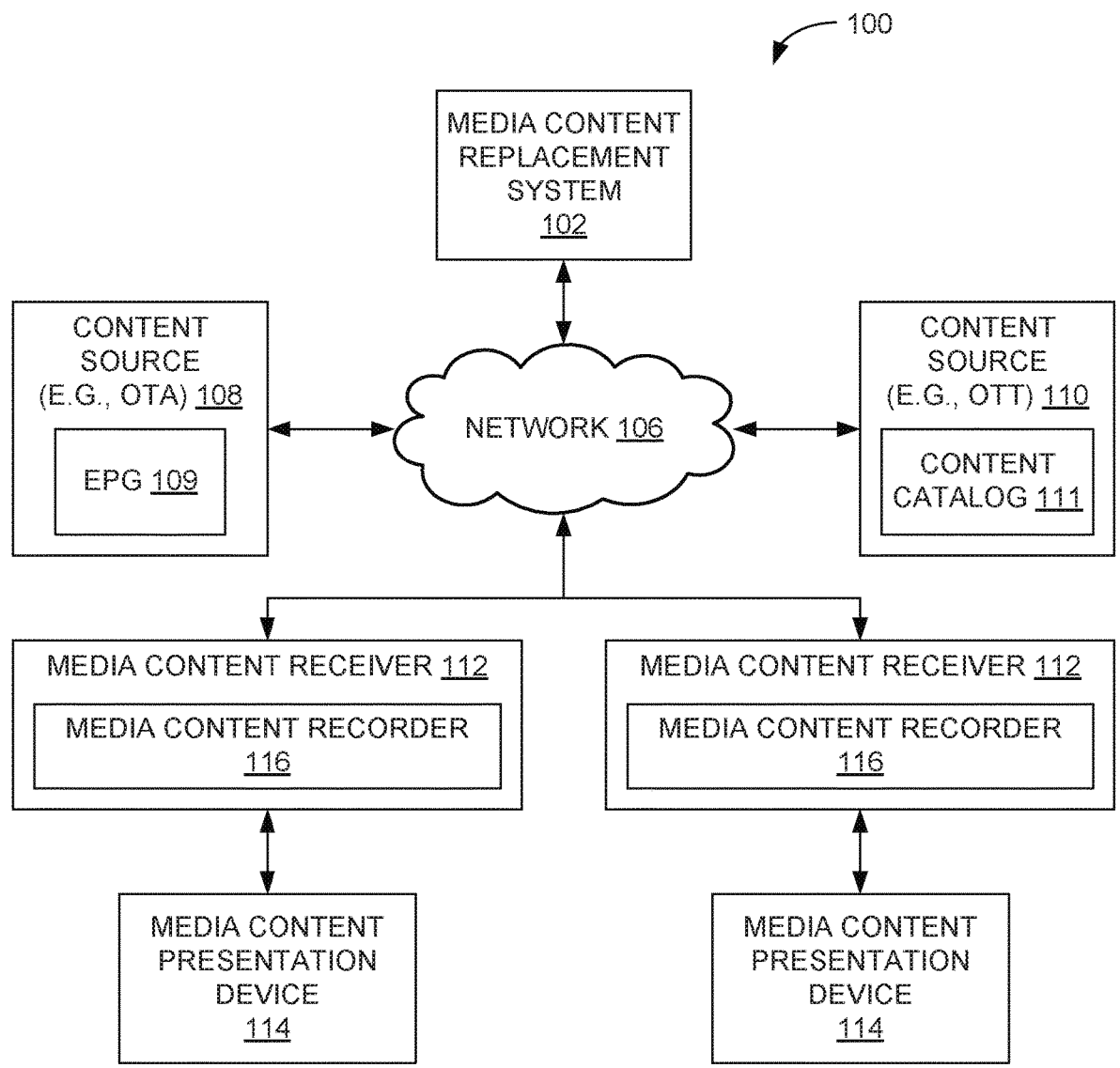
FIG. 1 is a block diagram of an example media content system including an example media content replacement system and an example media content receiver.

FIG. 1 is a block diagram of an example media content system 100 including an example media content replacement system 102 and one or more example media content receivers 112 with integrated media content recorders 116. In other example embodiments, the media content recorders 116 may be standalone devices, or may be integrated within other devices. The media content system 100 may also include one or more sources 108, 110 of media content. In example embodiments, the media content distributed within the media content system 100 may include audio data, video data, or both. Further, the media content may be organized into separate media content items, such as television programs, movies, video clips, individual songs, and the like. The media content sources 108, 110 may transmit media content items over a network 106 to one or more media content receivers 112. In example embodiments, the network 106 may be a wide-area network (WAN) (e.g., the Internet), a cellular network (e.g., third-generation (3G) or fourth-generation (4G) network), a cable television network, a satellite communication network, or any other communication network or connection suitable for carrying the media content items, or combinations thereof.

The content sources 108, 110 may be any devices or systems that generate and transmit media content items via the network 106 to the media content receivers 112, or that act as distributing systems for media content items that are generated by other devices, systems, or entities not explicitly shown in FIG. 1. As shown in FIG. 1, a first content source 108 may be an over-the-air (OTA) television content source 108 (e.g., a local television station, a broadcast television network, and so on), a cable television content source, a satellite television content source (e.g., a direct-broadcast satellite (DBS) system), or any other content source that may provide one or more channels or streams of media content items to the media content receivers 112 via the network 106. Such a content source 108 may also provide an electronic program guide (EPG) 109 that includes information for viewers regarding the particular media content items to be transmitted on particular channels or streams, the timing of those transmissions, and the like.

A second content source 110 may be any device or system that provides media content items over the Internet or other widely accessible medium without requiring an intervening operator or system, such as a cable or satellite operator or system, for distribution of the media content items. In some example embodiments, the second content source 110 (e.g., a website for streaming audio clips, video programs, and so on) may provide a content catalog 111 that includes information for viewers regarding the particular media content items available, the terms (e.g., payment, available times, etc.) for accessing the media content items, and so on. Other types of media content item sources other than the content sources 108, 110 of FIG. 1 are also possible.

Each of the media content receivers 112 may be any system or device configured to receive one or more of the media contents items via the network 106 and present the media content items for display or presentation to one or more viewers. Examples of the media content receivers 112 may include, but are not limited to, televisions, smart televisions, television set-top boxes (STBs), streaming devices, gaming devices, desktop computers, laptop computers, tablet computers, smart phones, and so on. The media content receiver 112 may process the incoming media content items and provide the items for presentation to a viewer via a media content presentation device 114, which may be a television, computer monitor, audio receiver with speakers, or other device or system configured to present media content to a viewer. The presentation of the media content items may be "live" (e.g., as the media content items are received via the network 106). The processing of the media content items may include, for example, frequency conversion, decoding, decryption, error detection/correction, format conversion, and so on. While the media content presentation devices 114 are shown as separate devices from their corresponding media content receivers 112, the media content presentation devices 114 may be integrated within the media content receiver 112 in some example embodiments.

As depicted in FIG. 1, one or more of the media content receivers 112 may include a media content recorder 116, such as a digital video recorder (DVR), that may be configured to record one or more of the media content items received at the media content receiver 112 to storage (e.g., one or more magnetic disk drives, optical disk drives, flash storage devices, etc.) integrated therein, or communicatively coupled thereto, for subsequent playback (e.g., at some point after the media content item has been received at the media content receiver 112). While the media content recorders 116 are shown as being integrated within their respective media content receivers 112, one or more of the media content recorders 116 may be separate from, but communicatively coupled to, their associated media content receivers 112.

The media content replacement system 102 may be coupled with the content sources 108, 110, the media content receivers 112, and the media content recorders 116 via the network 106. As is described in greater detail below, the media content replacement system 102 may receive information from a media content recorder 116 or associated media content receiver 112 identifying one or more media content items recorded and stored at some point at the media content recorder 116. Based on the information, the media content replacement system 102 may search one or more content sources 108, 110 to identify the presence or availability of one or more of the media content items, and to schedule another recording of a version of the media content items by the media content recorder 116 or another media content recorder 116.

As a result, at least some of the embodiments of the media content replacement system 102 and the media content recorders 116 (or their associated media content receivers 112) discussed herein facilitate replacement of previously recorded media content items. In some example embodiments, the previously recorded media content items may no longer be accessible to the viewer due to a failure of the media content recorder 116 or media content receiver 112 that causes a loss of the recorded items. In other example embodiments, the media content recorder 116 or the media content receiver 112 may be replaced due to upgrading the device for a newer model, or due to switching cable or satellite service providers. In yet other example embodiments, a previously recorded media content item may remain accessible, but the viewer may be interested in obtaining a different version of the media content item, such as a higher definition version or a version with different content (e.g., a "director's cut" of a motion picture). Other aspects of various example embodiments of the media content replacement system 102 and other components of the media content system 100 are discussed more fully below.

Figure 2:
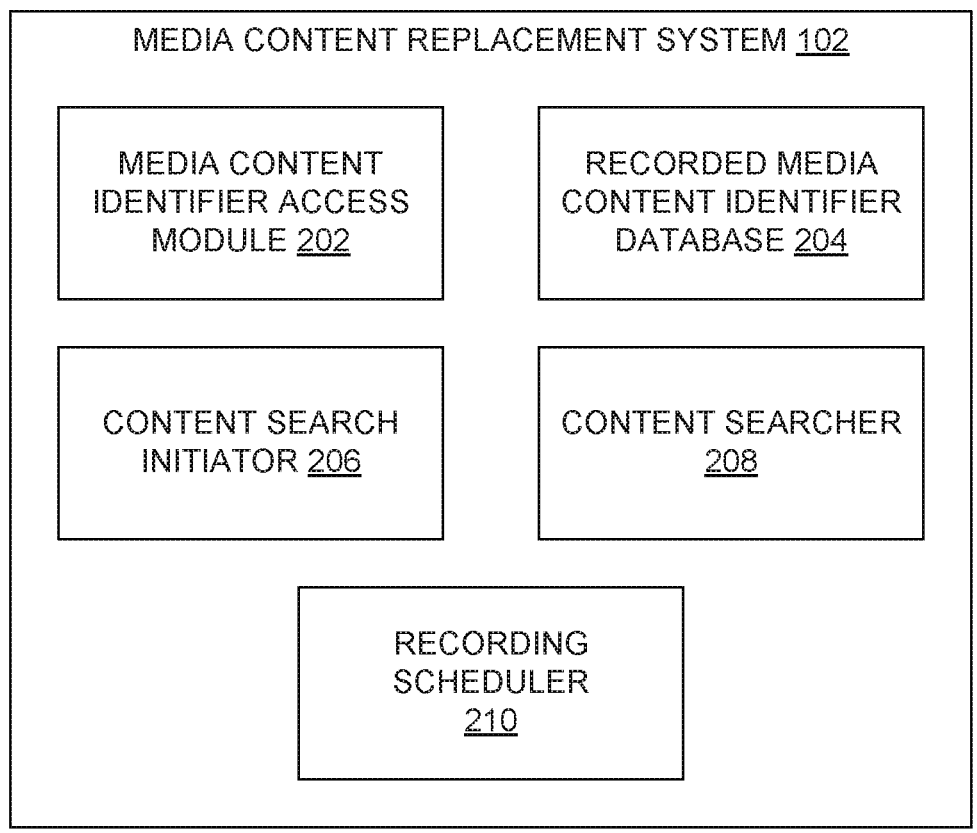
FIG. 2 is a block diagram of the example media content replacement system of FIG. 1.

FIG. 2 is a block diagram of the media content replacement system 102 of FIG. 1 according to an example embodiment. As shown in FIG. 2, the media content replacement system 102 may include one or more of a media content identifier access module 202, a recorded media content identifier database 204, a content search initiator 206, a content searcher 208, or a recording scheduler 210. In other example embodiments, one or more of the modules 202-210 of FIG. 2 may be omitted or combined with other modules, and one or more modules not explicitly discussed herein may be included within the media content replacement system 102. In some example embodiments, one or more of the modules 202-210 may include hardwired modules, one or more processors, associated memory that includes instructions executable by the one or more processors, or some combination thereof.

The media content identifier access module 202 may be configured to access identifiers for one or more media content items recorded and stored on one or more media content recorders 116. In one example embodiment, each identifier may include, for example, an identifier of the media content recorder 116 on which a media content item is stored, an identifier of the particular stored media content item, an identifier of a version (e.g., ultra-high-definition, high-definition, or standard-definition), and so on. Additional information may be included in the identifier as well. Other types or forms of the identifiers in the media content identifier access module 202 may be utilized in other embodiments. In some example embodiments, a media content recorder 116 or corresponding media content receiver 112 may push each media content identifier associated with a recorded media content item via the media content identifier access module 202 in response to the recording of that media content item. In other example embodiments, a media content recorder 116 or associated media content receiver 112 may push several such media content identifiers to the media content identifier access module 202 in a batch mode operation periodically, such as, for example, once per day. In yet other example embodiments, the media content identifier access module 202 may pull stored media content identifiers from each of the media content recorders 116 or corresponding media content receivers 112, such as periodically, on an as-needed basis, or according to some other schedule or event-driven scenario. The media content identifier access module 202 may then store the received media content access identifiers in the recorded media content identifier database 204. An example of data stored in the recorded media content identifier database 204 is discussed below in connection with FIG. 5.

In some example embodiments, the media content identifier access module 202 may be configured to access or receive information indicating that a previously recorded media content item has been deleted (e.g., by a viewer) from the media content recorder 116. In response to such information, the media content identifier access module 202 may remove an entry (if present) in the recorded media content identifier database 204 corresponding to the deleted media content item. The media content recorder 116 or corresponding media content receiver 112 may push such information to the media content identifier access module 202, or the media content identifier access module 202 may pull the information from the media content recorder 116 or the media content receiver 112, in a manner similar to that mentioned above.

The content search initiator 206 may be configured to initiate a search of one or more content sources 108, 110 for a media content item previously recorded in storage of a media content recorder 116. In an example embodiment, the content search initiator 206 may access the recorded media content identifier database 204 to determine, for a particular media content recorder 116, the one or more media content items that are to be recorded at the particular media content recorder 116. The content search initiator 206 may initiate a search of one or more content sources 108, 110 for the one or more media content items via the content searcher 208.

In some example embodiments, the content search initiator 206 may be configured to initiate a search via the content searcher 208 based on one or more inputs or events. In an example embodiment, the content search initiator 206 may receive a request from a media content recorder 116 or a corresponding media content receiver 112 to re-record one or more media content items that were previously recorded at the media content recorder 116, but may no longer be stored at the media content recorder 116. Such a request may be made if, for example, an error within the media content recorder 116 caused the stored media content items to be inaccessible, such as an inadvertent deletion of the recorded media content items.

In another example embodiment, the media content recorder 116 or corresponding media content receiver 112 issuing the request may be different from the media content recorder 116 upon which the media content items were initially recorded. For example, the requesting media content recorder 116 may be a replacement unit for the media content recorder 116 initially recording the media content items.

In another example embodiment, the content search initiator 206 may receive a request via the network 106 from a media content recorder 116 or associated media content receiver 112 having a particular stored media content item to search for a different version of a specific media content item recorded at the media content recorder 116. In addition, the request may include an identifier of the media content item, and possibly an indication of the current version of the media content item stored in the media content recorder 116 or an indication of a desired version of the media content item. The content search initiator 206 may then initiate a search for that particular media content item. The request, in some example embodiments, may also provide information indicating a priority or order by which multiple such sources 108, 110 are to be searched.

In yet other example embodiments, the content search initiator 206 may initiate a search for one or more media content items in response to another event aside from an explicit request from a media content recorder 116 or associated media content receiver 112. Such events may include, for example, a request from a content source 108, 110 (e.g., a server of a cable or satellite television distribution network), a communication device (e.g., a desktop computer, laptop computer, tablet computer, or smart phone) of a viewer associated with the media content recorder 116 to which the one or more media content items were initially recorded, and the like.

The content searcher 208 may be configured to search one or more content sources 108, 110 in response to the content search initiator 206 initiating a search of a media content item. In an example embodiment, the content searcher 208, in response to the initiating of a search, may search multiple content sources 108, 110 in an order specified in a priority list, which may be provided by a media content recorder 116, an associated media content receiver 112, a server, or another entity. In a particular example embodiment, the content searcher 208 may first search an EPG 109 of a first content source 108, such as a cable or satellite television service provider or network, for a showing of the media content item. Such a search may include both media content items scheduled to be presented on one or more channels at specific times, as well as those media content items that may be available via video-on-demand (VOD) during a particular period of time. If the particular media content item is not available at the first content source 108, the content searcher 208 may search a content catalog 111 of a second content source 110, such as an over-the-top source (e.g., a web-based content service) for the media content item. The over-the-top source, in some example embodiments, may provide the media content item of interest as streaming content available at a particular time, or as a video-on-demand item available for some stated period of time. In at least some example embodiments, third and subsequent content sources 108, 110 may also be searched if the media content item of interest is not found at those earlier sources.

In some example embodiments, the list of content sources 108, 110 to be searched may be prioritized between content sources 108, 110 that are free to the viewer and content sources 108, 110 that require a fee to be paid by the viewer. In an example embodiment, free content sources 108, 110 may be searched before content sources 108, 110 that require a fee to be paid for the media content item. Further, in some example embodiments, content sources 108, 110 for which the viewer associated with the media content recorder 116 already possesses a current subscription may be searched prior to other content sources 108, 110 to which the viewer does not possess a current subscription, if such a subscription is necessary for access to the media content items provided by that source 108, 110. Further, in some example embodiments, media content items available within a particular media content source 108, 110 that are free to the viewer may be prioritized before a version of the media content item that is available to the viewer for a fee within that same content source 108, 110 or another content source 108, 110. In some example embodiments, an evaluation as to whether a particular media content item is free from a specific content source 108, 110 may depend upon additional information, such as whether a viewer associated with the media content recorder 116 associated with the viewer is a current subscriber of the content source 108, 110, whether the subscribed viewer may access the media content item from the content source 108, 110 for free or for an additional fee, and so forth.

In an example embodiment, the content searcher 208 may not terminate a search for a media content item once that item is found, but may instead search one or more content sources 108, 110 for multiple versions of the media content item, and then select a particular one of the multiple versions for the viewer. For example, if the content searcher 208 discovers a standard-definition version of a media content item at a first content source 108, 110, the content searcher 208 may continue to search the current content source 108, 110 or another content source 108, 110 to search for a high-definition or ultra-high-definition version of the same media content item. Whether to continue to search for a second version of a media content item after a first version has been found may depend, for example, on information provided by the viewer (e.g., via the media content recorder 116 or associated media content receiver 112, via a separate communication device, and so on) regarding preferences as to versions to be recorded or viewed (e.g., high-definition versions versus standard-definition versions, R-rated versions vs. PG-rated versions, versions that include advertisements versus commercial-free versions).

The content searcher 208 may be configured to forward the identities of the discovered versions of the media content items to be recorded at the media content recorder 116 to the recording scheduler 210. In some example embodiments, the content searcher 208 may provide the identities of multiple versions of a particular media content item to the recording scheduler 210 that the content searcher 208 has found. Also in some example embodiments, the content searcher 208 may provide the identities of media content items that are recordable (e.g., media content items that will be shown via a broadcast channel in the near future) as well as media content items that are not recordable, but are still available for viewing (e.g., media content items available via video-on-demand via a cable or satellite television distribution network, media content items available for streaming on-demand via an over-the-top content source 108, 110, and so on). In addition, the content searcher 208, in some example embodiments, may provide information regarding the particular content source 108, 110 at which the media content item was found; a channel, URL, or other indication of where the media content item may be found at the content source 108, 110; and a day and time at which the media content item is available for recording or access at the media content recorder 116 or associated media content receiver 112.

In the event that a media content item is available for viewing, but is not recordable at the media content recorder 116, the content searcher 208 may provide the content source 108, 110 at which the media content item is available; a channel, URL, or other identifier for the media content item at the content source 108, 110; and one or more times at which the media content item is available at the content source 108, 110 via the media content recorder 116 or its corresponding media content receiver 112. For example, the media content recorder 116 may be available via a cable television network, satellite television network, website, or other content source 108, 110 on a video-on-demand or streaming basis that is not in a recordable format. As discussed below, the recording scheduler 210 may then forward this information to the media content recorder 116 or associated media content receiver 112 to facilitate viewing of the media content item by a viewer without recording the media content item.

In some example embodiments, the content searcher 208 may save the search results (e.g., an identifier of a media content item, the content source 108, 110 in which the media content item was found, and so on) so that searches involving other media content recorders 116 or associated media content receivers 112 may employ the saved search results instead of performing a new search. Further, in some example embodiments, the saved search results may expire after some particular period of time. In yet other example embodiments, the content searcher 208 may periodically perform searches of some content sources 108, 110 and save the results without always being prompted by the content search initiator 206 to perform a search. In such example embodiments, the response to a request or other event causing a replacement of a media content item may occur more quickly due to a reduction or elimination of searches in response to the request or other event.

The recording scheduler 210 may be configured to schedule recordings at the media content recorder 116 for one or more of the media content items identified by the content searcher 208 that are recordable at the media content recorder 116. In an example embodiment, the recording scheduler 210 may generate and transmit a recording command to be executed by the media content recorder 116. In an example embodiment, the recording command may include a channel, URL, or other access identifier to be used to receive the media content item; and possibly a day and time (or a period of time) at which the media content item may be recorded. The recording scheduler 210 may transmit such a command via the network 106 to the media content recorder 116 or the media content receiver 112, in at least some example embodiments.

In some example embodiments, the recording scheduler 210 may be configured to transmit an indication to the media content recorder 116 or its corresponding media content receiver 112 of a media content item that was previously recorded and is currently available, but is no longer recordable by the media content recorder 116, as discussed above. The indication may include, for example, the content source 108, 110 at which the media content item is available; a channel, URL, or other identifier for the media content item at the content source 108, 110; and one or more times at which the media content item is available at the content source 108, 110.

In some example embodiments, the recording scheduler 210, upon transmitting a command to schedule a recording of a media content item at the media content recorder 116, or upon transmitting an indication of a media content item that is available for viewing, but is unrecordable at the media content recorder 116, may update the recorded media identifier database 204 to indicate such a transmission.

Figure 3:
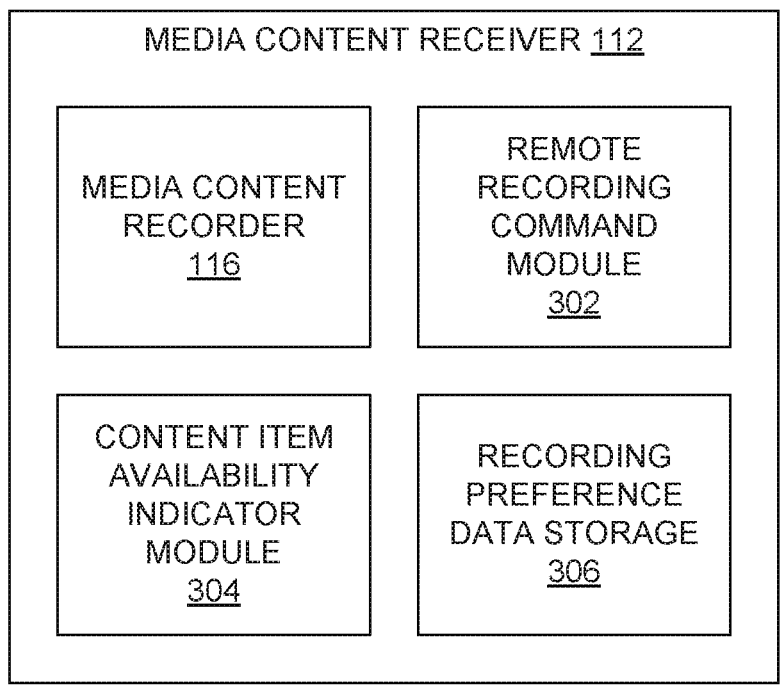
FIG. 3 is a block diagram of the example media content receiver of FIG. 1.

FIG. 3 is a block diagram of one of the example media content receivers 112 of FIG. 1. In the example embodiment of FIG. 3, the media content receiver 112 may include one or more of the media content recorder 116, a remote recording command module 302, a content item availability indicator module 304, and recording preference data storage 306. In other example embodiments, one or more of the media content recorder 116 or the modules 302-306 of FIG. 3 may be omitted or combined with other modules, and one or more modules not explicitly discussed herein may be included within the media content replacement system 102. In other example embodiments, one or more of the modules 302-306 may be incorporated within the media content recorder 116. Also, while the media content recorder 116 is shown in FIG. 3 as being included within the media content receiver 112, the media content recorder 116 may be embodied in a device separate from the media content receiver 112 in some examples. In some example embodiments, one or more of the media content recorder 116 or the modules 302-306 may include hardwired modules, one or more processors, and associated memory that includes instructions executable by the one or more processors, or some combination thereof.

The media content recorder 116 may be configured to record, and facilitate playback of, media content items for subsequent viewing by a viewer. In an example embodiment, the media content recorder 116 may include a non-volatile storage medium, such as a hard disk drive, optical disk drive, flash memory, or the like, for storing the recorded media content items. Viewer input, such as by way of a remote control device for the media content receiver 112, for example, may control the recording and playback of a media content item (e.g., recording a media content item, initiating playback of a media content item, manually fast-forwarding through portions of the media content item, rewinding to review a portion of the media content item that was previously played, and so on).

The remote recording command module 302 may be configured to receive recording commands originating externally to the media content recorder 116 or the media content receiver 112, such as from the media content replacement system 102 over the network 106. As described above, a recording command may indicate a particular media content item to be recorded, and may include a content source 108, 110 at which the media content item is available; a channel, URL, or other identifier that identifies the media content item at the source 108, 110; and a day and/or time at which the media content item will appear for recording at the media content recorder 116. In some example embodiments, the information from the received recording command may be included in the same recording schedule of the media content recorder 116 with recordings set by the viewer, such as by way of a remote control device for the media content receiver 112 or the media content recorder 116.

The content availability indicator module 304 may be configured to receive an indication from the media content replacement system 102 referencing a media content item that is not available for recording at the media content recorder 116, but is available for viewing (e.g., "live") via the media content receiver 112 or the media content recorder 116. Similar to a recording command, the indication may identify the content source 108, 110 at which the media content item of interest is available; the channel, URL, or other location at the content source 108, 110 at which the media content item may be received or accessed, and a time period during which the media content item may be viewed. In some example embodiments, the content availability indicator module 304 may present to the viewer via a media content presentation device 114 the information provided in the received indication to inform the viewer that the media content item of interest is unrecordable, but may be accessed or received and viewed, as provided for in the indication. In another example embodiment, the content availability indicator module 304 may program a reminder module (not explicitly referenced in FIG. 3) of the media content receiver 112 that provides a visual or audible reminder to the viewer via the media content presentation device 114 at a time during which the media content item is available, or that automatically tunes or configures the media content receiver 112 to present the media content item to the viewer.

The recording preference data storage 306 may be configured to store viewer preferences regarding the replacement of recordings at the media content recorder 116. In an example embodiment, a viewer may provide the preference information by way of the remote control device in response to questions displayed via the media content presentation device 114, by way of a smart phone or computer, or via other means. In an example embodiment, the recording preference data storage 306 may be configured to store information regarding the preferences of the viewer as to content sources 108, 110 to be searched, the order in which those content sources 108, 110 are to be searched, the quality level (e.g., ultra-high-definition, high-definition, etc.) at which a media content item is to be recorded, the rating level (e.g. R versus PG-13) at which a media content item is to be recorded, whether indications should be provided regarding media content items that are available for viewing but unavailable for recording, and so forth. Other types of preference information may be supported in other embodiments. In some example embodiments, at least some of the preference information in the recording preference data storage 306 may be transmitted via the network 106 to the media content replacement system 102 for use by one or more of the modules 202-210 therein in performing the operations ascribed thereto, as discussed above, such as the searching of media content items, the transmission of recording commands to the media content receiver 112 or media content recorder 116, and so on. In some example embodiments, the media content receiver 112, the media content recorder 116, and other modules of FIG. 3 may use the preference information to filter and process recording commands and media content item indications received from the media content replacement system 102.

Figure 4:
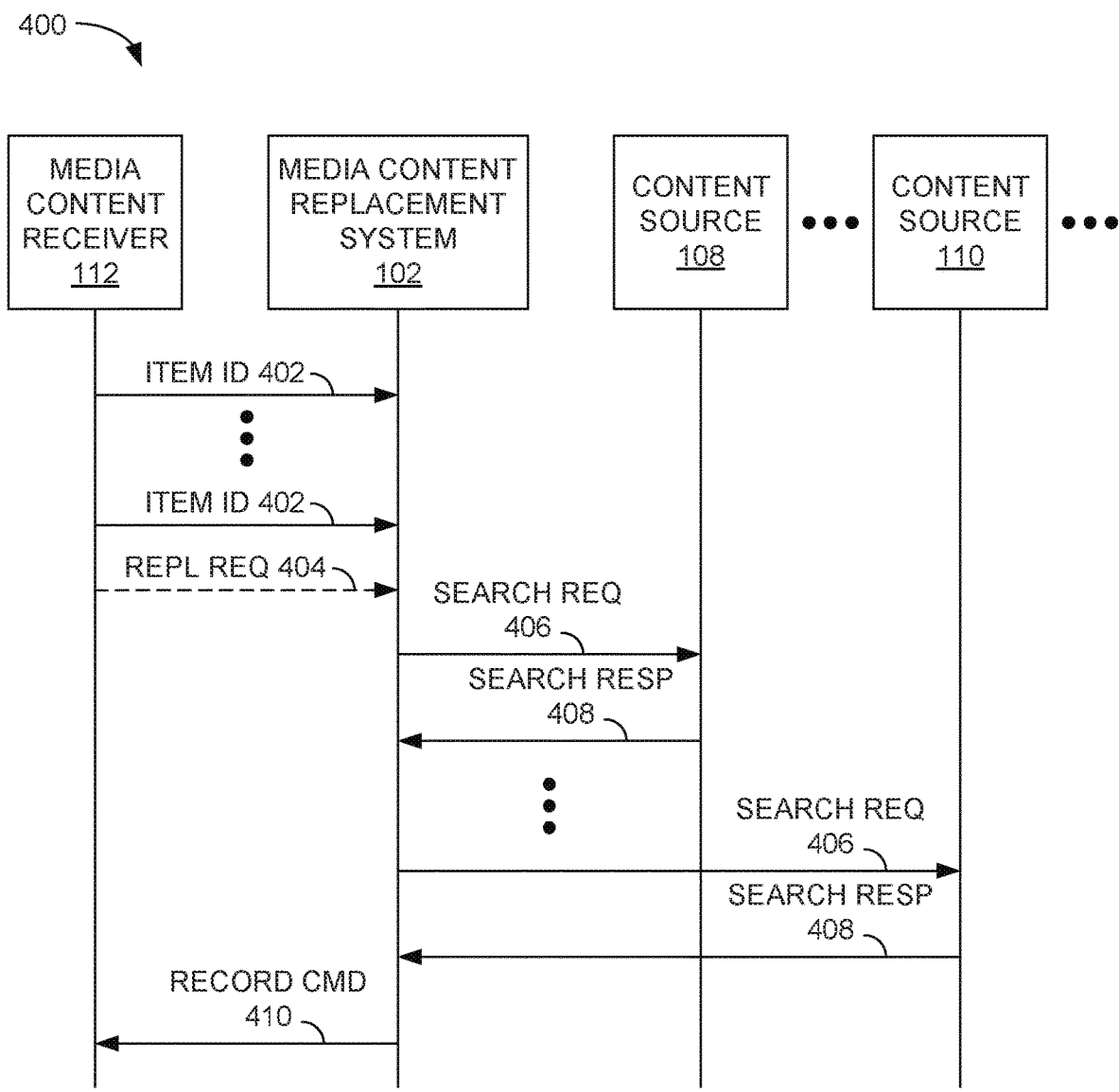
FIG. 4 is a communication diagram of example communications for content replacement occurring in the example media content system.

FIG. 4 is a communication diagram 400 of example communications for content replacement occurring in the example media content system 100. In this example embodiment, a media content receiver 112 transmits multiple media content item identifiers 402 over time to the media content replacement system 102. In an example embodiment, the media content recorder 116, in response to recording a media content item, transmits a corresponding media content item identifier 402 to the media content identifier access module 202 via the network 106. As discussed earlier, the media content receiver 112 may push a media content item identifier 402 immediately after recording of the media content item, or may push several media content identifiers together in a batch mode. In other example embodiments, the media content identifier access module 202 may pull such information periodically from the media content receiver 112 or the media content recorder 116. The media content identifier access module 202 stores the media content item identifiers 402 in the recorded media content identifier database 204, as described above.

After the transmitting of the media content item identifiers 402, the media content receiver 112 or the media content recorder 116 may then transmit a replacement request 404 to the media content replacement system 102. In an example embodiment, the replacement request 404 indicates that the recordings listed in the recorded media content identifier database 204 for the media content recorder 116 or associated media content receiver 112 are to be replaced (e.g., re-recorded) at the media content recorder 116.

In response to the request, the content search initiator 206 may initiate a search of one or more media content sources 108, 110 for the media content items listed in the media content identifier database 204 for the media content recorder 116. In other example embodiments, the content search initiator 206 may initiate such a search without receiving an explicit replacement request 404, such as by receiving an indication that a new media content receiver 112 or media content recorder 116 has been put in service that replaces the original media content recorder 116 upon which the media content items were stored.

In an example embodiment, the content search initiator 206 may cause the content searcher 208 to search the one or more media content sources 108, 110 for the media content items to be discovered. As shown in FIG. 4, the content searcher 208 may issue a search request 406 for one or more media content items to a content source 108, which may in return issue a search response 408. In an example embodiment, each search request 406 may be a request for availability and other access information relating to a particular media content item, and the search response 408 may be a response indicating whether the media content item is available at the content source 108, as well as access information (e.g., channel, URL, time period, and so on) if the media content item is available. In another example embodiment, the search request 406 may be a request for an electronic program guide 109, a content catalog 111, or other set of data providing content availability and access information for multiple media content items, and the search response 408 may be the electronic program guide 109, content catalog 111, or other information that was requested.

In each example embodiment, the content searcher 208 may not issue a request for each media content item or multiple media content items, as the content searcher 208 may recently have received availability and access information for each of the media content items for which a search has been initiated.

The content searcher 208, after receiving the availability and access information associated with a media content item, may cause the recording scheduler 210 to generate and transmit a recording command 410 to the media content recorder 116 or associated media content receiver 112 to record the media content item, presuming the media content item is recordable at the media content recorder 116 from the particular content source 108, 110. If, instead, the media content item is available for viewing from at the media content receiver 112 or the media content recorder 116, but is not recordable, the content searcher 208 or the recording scheduler 210 may instead transmit a message or other communication indicating an identifier for the media content item involved, the particular content source 108, 110 at which the media content item is available, and access information (e.g., channel, URL, day and time, possible cost or fee, etc.) for the media content item. Further, if the media content item is not available at any of the content sources 108, 110 searched, the content searcher 208 or the recording scheduler 210 may transmit a message or other communication indicating that fact to the media content receiver 112.

FIG. 5 is a graphical depiction of an example recorded media content identifier database 204 employed in the example media content replacement system 102 of FIG. 2. The recorded media content identifier database 204 may be implemented by a database management system (DBMS), although other types of databases, as well as more generalized data structures not strictly implemented as databases, may be utilized in other embodiments.

In the example embodiment of FIG. 5, the recorded media content identifier database 204 may include multiple entries, with each entry representing a particular media content item previously recorded by a particular media content recorder 116. Further, each entry may include one or more of a device identifier 502, a recorded media content item identifier 504, a version code 506, a replacement status 508, or a replacement source 510. Other example embodiments may include greater or fewer numbers of fields for each entry.

The device identifier 502 may be a unique identifier (e.g., model number and serial number) of the particular media content recorder 116 or associated media content receiver 112 at which the particular media content item was previously recorded. The recorded media content item identifier 504 may be a unique identifier (e.g. alphanumeric name of the media content item) for the particular media content item. The version code 506 may indicate a particular version (e.g., ultra-high-definition versus high-definition versus standard-definition, form factor, PG-13-rated versus R-rated versus director's cut, etc.) of the media content item that was recorded previously or is to be recorded at the particular media content recorder 116. The replacement status 508 may indicate a particular status of the media content item relative to the particular media content recorder 116 (e.g., not recorded at the media content recorder 116 and availability unknown; not recorded at the media content recorder 116 and not currently available; not recorded at the media content recorder 116, but available and recordable; not recorded at the media content recorder 116, but available, but not recordable, currently recorded at the media content recorder 116, etc.). The replacement source 510 may indicate, in the case of the media content item being available, the particular content source 108, 110, as well as access information (channel, URL, day and time, etc.) for accessing the media content item. In some example embodiments, any one or more of the media content identifier access module 202, the content search initiator 206, the content searcher 208, or the recording scheduler 210 may access the entries of the recorded media content identifier database 204 to generate the entries, as well as retrieve or update the status of each of the entries.

Figure 6:
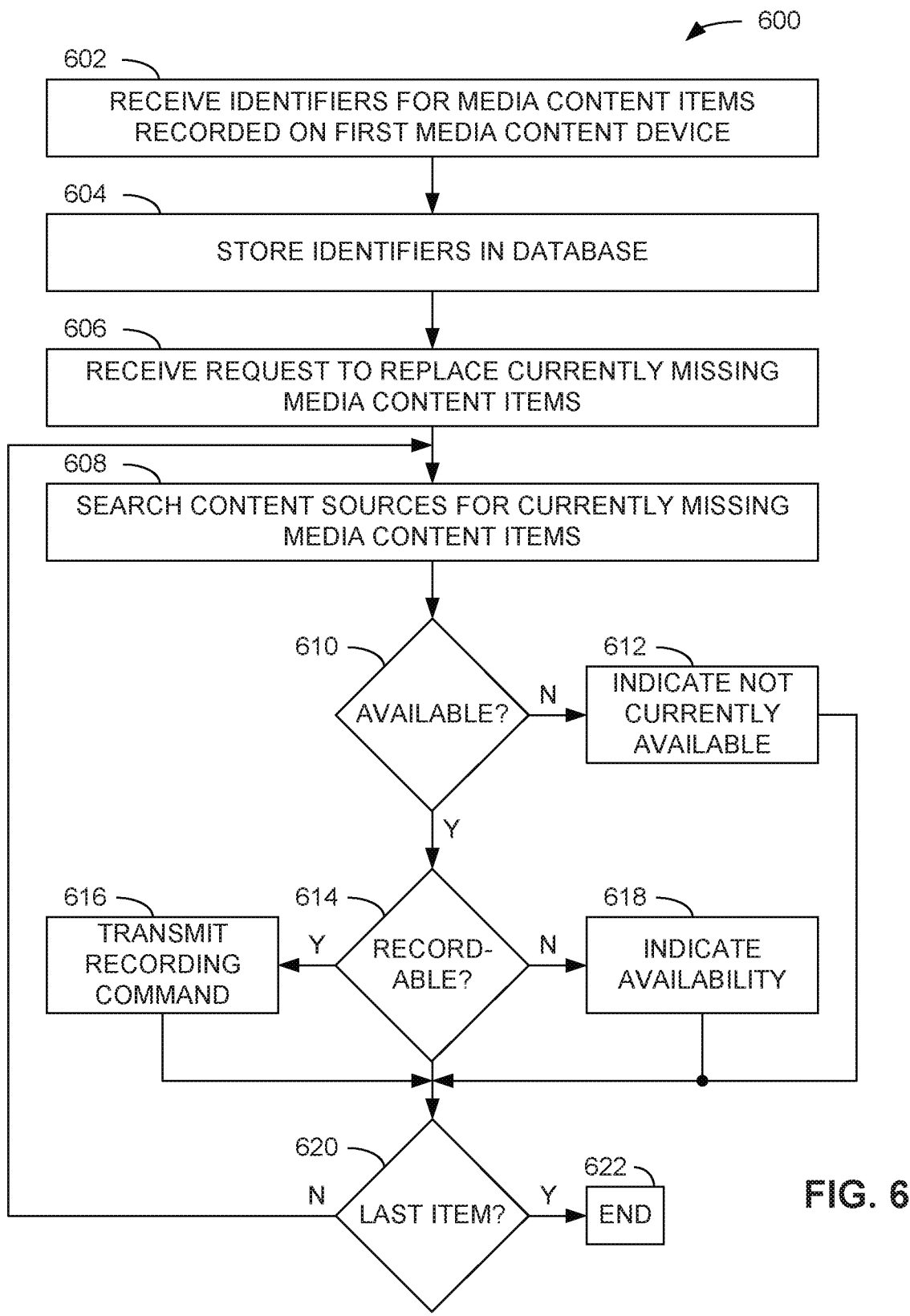
FIG. 6 is a flow diagram of an example method for replacing missing or otherwise unusable media content items previously recorded on a media content recorder.
Figure 7:
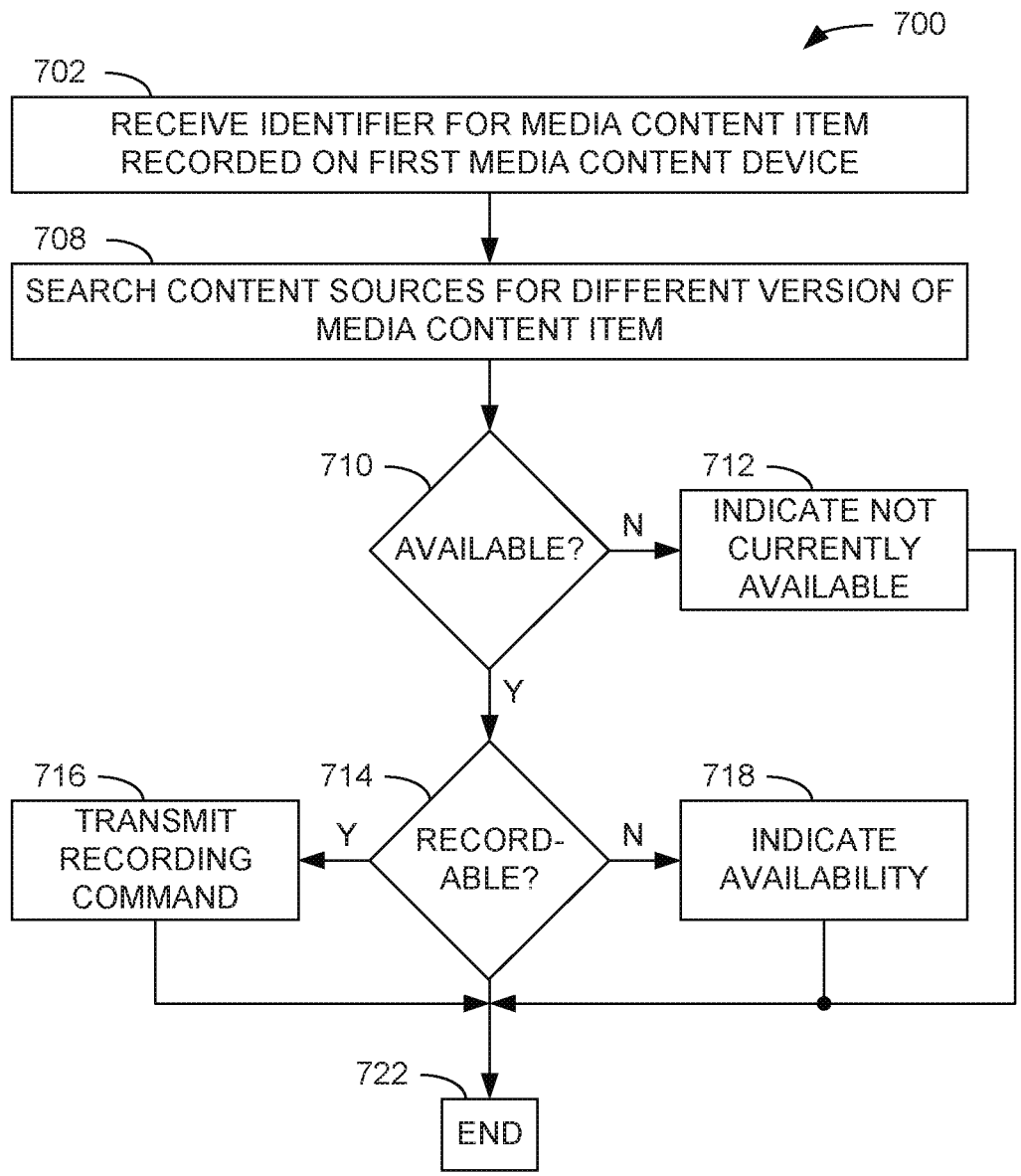
FIG. 7 is a flow diagram of an example method for acquiring a different version of a media content item currently recorded on a media content recorder.

FIGS. 6 and 7 provide methods of operating various devices or systems of the media content system 100 of FIG. 1. However, other devices or systems not specifically disclosed herein may also perform these methods and variations thereof. Also, while the operations of the methods of FIGS. 6 and 7 are presented in a particular order, other orders of execution are also possible, including simultaneous, concurrent, or overlapping execution of two or more operations.

FIG. 6 is a flow diagram of an example method 600 for replacing missing or otherwise unusable media content items previously recorded on a media content device (e.g., a media content recorder 116). In the method 600, the media content replacement system 102 (e.g., via the media content identifier access module 202) may receive identifiers for media content items recorded on a media content device (operation 602) and store the identifiers in a database or data storage (e.g., the recorded media content identifier database 204) (operation 604). The media content replacement system 102 (e.g., via the content search initiator 206) may receive a request to replace currently missing media content items (operation 606). In an example embodiment, the request may be received from the first media content device, which may have been repaired, or its media content storage may have been replaced or reformatted. In another example embodiment, the request may be received from a second media content device that serves as a replacement for the first media content device.

The media content replacement system 102 (e.g., via the content search initiator 206 and the content searcher 208) may search one or more content sources 108, 110 for the currently missing media content items (operation 608). In an example embodiment, multiple content sources 108, 110 may be searched in a particular order of priority, and such order may be determined at the media content replacement system 102, the media content receiver 112, the media content recorder 116, or another device or system. Such order may be influenced by one or more factors, such as a preexisting relationship between the media content replacement system 102 and the content source 108, 110; the existence of a subscription or membership of the viewer or the media content device with the content source 108, 110; whether the viewer is to pay for media content at the content source 108, 110; and so on.

If a media content item is not available at one of the sources (operation 610), the media content replacement system 102 may indicate that fact to the media content device (operation 612). In some example embodiments, the media content replacement system 102 may search the content sources 108, 110 again after some time delay (e.g., one day, one week, and so forth) for the unavailable media content item. If, instead, the media content item is available at one or more of the sources (operation 610), but is not recordable (operation 614), the media content replacement system 102 may indicate such availability to the media content device (operation 618). Otherwise, if the media content item is available (operation 610) and recordable (operation 614), the media content replacement system 102 may generate and transmit a recording command (operation 616) to the media content device to record the media content item, as described above. Optionally, the media content replacement system 102 may provide some other indication of the media content item and its access information to the media content device to facilitate the media content device generating its own command to record the media content item.

If all outstanding media content items for the particular media content device have been addressed (operation 620), the media content replacement system 102 may then end the process (operation 622), at least for the time being. If, instead, outstanding media content items remain for the particular media content device, the content sources 108, 110 may be searched for the next media content item (operation 608).

FIG. 7 is a flow diagram of an example method 700 for acquiring a different version of a media content item currently recorded on a media content recorder 116. In the method 700, the media content replacement system 102 (e.g., via the media content identifier access module 202) may receive an identifier for a media content item recorded on a media content device (operation 702). The media content replacement system 102 (e.g., via the content search initiator 206) may receive the identifier for the media content item in the form of a request to replace the media content item currently stored at the media content device with a different version. In an example embodiment, the request may include an indication of the version (e.g., ultra-high-definition, original theatrical release) of the media content item to be recorded at the media content device, or may provide some threshold version (e.g., high-definition or better) of the media content item to be recorded. The media content replacement system 102 (e.g., via the content search initiator 206 and the content searcher 208) may search one or more content sources 108, 110 for the requested version of the currently recorded media content item (operation 708). The remaining operations 710-718 and 722 of the method 700 are substantially similar to the operations 610-618 and 622 of the method 600 of FIG. 6.

In an example embodiment, a method comprises the operation of searching, using one or more hardware processors, at least one media content source over a communication network for a media content item recorded to storage of a first media content device. Based on the media content item being found at a first media content source of the at least one media content source, a recording of the media content item to storage of a second media content device from the first media content source is scheduled based on the media content item being recordable from the first media content source at the second media content device, and the availability of the media content item at the first media content source is indicated to the second media content device based on the media content item not being recordable from the first media content source at the second media content device.

In another example embodiment, possibly including all previous example embodiments, the method further comprises receiving a request over the communication network to replace the media content item recorded to the storage of the first media content device, the searching of the at least one media content source occurring in response to the request.

In another example embodiment, possibly including all previous example embodiments, the request is received in response to the second media content device becoming available to record the media content item, the second media content device configured to replace the first media content device.

In another example embodiment, possibly including all previous example embodiments, the request is received from the second media content device.

In another example embodiment, possibly including all previous example embodiments, the method further comprises accessing, from the first media content device over the communication network, prior to the receiving of the request, an identifier for the media content item recorded to the storage of the first media content device, and storing the identifier for the media content item in a media content identifier data storage comprising identifiers for a plurality of media content items recorded to the storage of the first media content device.

In another example embodiment, possibly including all previous example embodiments, the request to replace the media content item comprises a request to replace the plurality of media content items.

In another example embodiment, possibly including all previous example embodiments, the second media content device comprises the first media content device.

In another example embodiment, possibly including all previous example embodiments, the method further comprises delaying before again searching the at least one media content source for the media content item based on the media content item not being found at the at least one media content source.

In another example embodiment, possibly including all previous example embodiments, the at least one media content source comprises an over-the-top media content source.

In another example embodiment, possibly including all previous example embodiments, the searching of the at least one media content source occurs in a particular order.

In another example embodiment, possibly including all previous example embodiments, the method further comprises accessing configuration data corresponding to the first media content device, the configuration data specifying the particular order.

In another example embodiment, possibly including all previous example embodiments, the media content item is not recordable from the first media content source at the second media content device due to a viewer corresponding to the second media content device not being subscribed to the first media content source.

In another example embodiment, possibly including all previous example embodiments, the searching of the at least one media content source comprises accessing an electronic program guide of at least one of an over-the-air television network, a cable television network, or a satellite television network.

In another example embodiment, possibly including all previous example embodiments, the searching of the at least one media content source comprises accessing a content catalog of an over-the-top content source.

In another example embodiment, possibly including all previous example embodiments, the searching of the at least one media content source comprises searching the at least one media content source for a version of the media content item with a video resolution higher than a video resolution of a version of the media content item recorded at the first media content device.

In another example embodiment, possibly including all previous example embodiments, the searching of the at least one media content source comprises searching the at least one media content source for a version of the media content item having a content rating different that a content rating of a version of the media content item recorded at the first media content device.

In another example embodiment, possibly including all previous example embodiments, the scheduling of the recording of the media content item comprises transmitting a command to the second media content device to record the media content item, the command comprising at least one of a channel identifier, a recording day, or a recording time for the recording.

In another example embodiment, possibly including all previous example embodiments, the scheduling of the recording of the media content item comprises transmitting a command to the second media content device to record the media content item, the command comprising a uniform resource locator for the media content item.

In an example embodiment, a media system comprises one or more hardware processors and a memory storing instructions that, when executed by at least one of the one or more hardware processors, causes the media system to perform operations comprising searching at least one media content source over a communication network for a media content item recorded to storage of a first media content device. Based on the media content item being found at a first media content source of the at least one media content source, recording of the media content item to storage of a second media content device from the first media content source is scheduled based on the media content item being recordable from the first media content source at the second media content device, and the availability of the media content item at the first media content source is indicated to the second media content device based on the media content item not being recordable from the first media content source at the second media content device.

In another example embodiment, possibly including all previous example embodiments, the operations further comprise receiving a request over the communication network to replace the media content item recorded at the first media content device, and initiating the search for the media content item in response to the request.

In another example embodiment, possibly including all previous example embodiments, the operations further comprise accessing, from the first media content device over the communication network, an identifier for the media content item, and storing the identifier for the media content item in a media content identifier data storage.

In an example embodiment, a non-transitory computer-readable storage medium has stored thereon instructions that, when executed by one or more hardware processors of a machine, cause the machine to perform operations comprising searching at least one media content source over a communication network for a media content item recorded to storage of a first media content device. Based on the media content item being found at a first media content source of the at least one media content source, recording of the media content item to storage of a second media content device from the first media content source is scheduled based on the media content item being recordable from the first media content source at the second media content device, and the availability of the media content item at the first media content source is indicated to the second media content device based on the media content item not being recordable from the first media content source at the second media content device.

Figure 8:
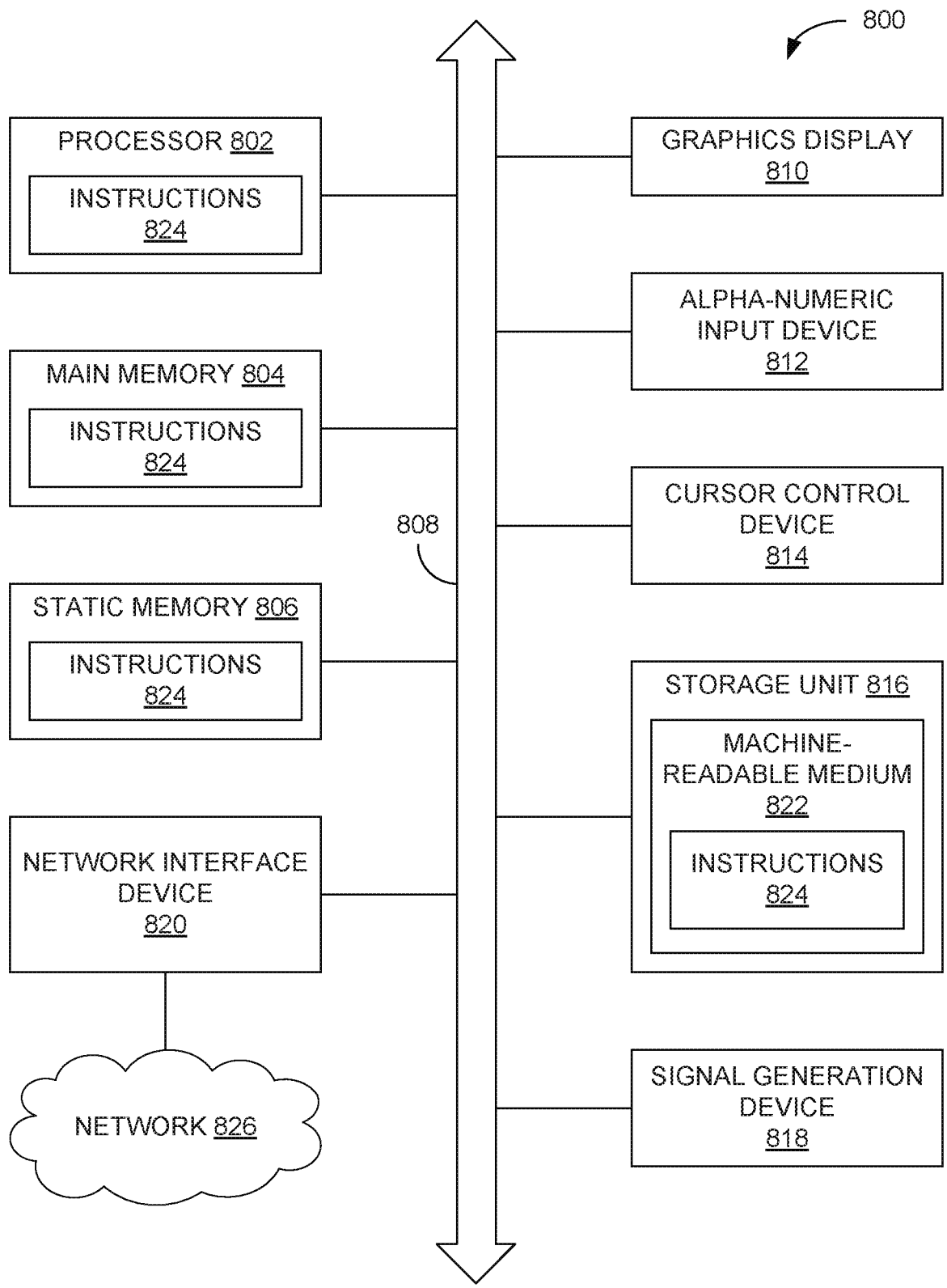
FIG. 8 is a simplified block diagram of a machine in an example form of a computing system within which a set of instructions for causing the machine to perform any one or more of the methodologies discussed herein may be executed.

FIG. 8 is a block diagram illustrating components of a machine 800, according to some example embodiments, able to read instructions 824 from a machine-readable medium 822 (e.g., a non-transitory machine-readable medium, a machine-readable storage medium, or a computer-readable storage medium) and perform any one or more of the methodologies discussed herein, in whole or in part. Specifically, FIG. 8 depicts the machine 800 in the example form of a computer device (e.g., a computer) within which the instructions 824 (e.g., software, firmware, a program, an application, an applet, an app, or other executable code) for causing the machine 800 to perform any one or more of the methodologies discussed herein, in whole or in part.

For example, the instructions 824 may cause the machine 800 to execute the flow diagrams of FIGS. 6 and 7. The instructions 824 can transform the general, non-programmed machine 800 into a particular machine (e.g., specially configured machine) programmed to carry out the described and illustrated functions in the manner described. Also in example embodiments, the machine 800 may operate as one or more of the media content receiver 112 of FIGS. 1 and 3, the media content recorder 116 of FIGS. 1 and 3, the media content replacement system 102 of FIGS. 1 and 2, or any other computing system or device described herein.

In example embodiments, the machine 800 operates as a standalone device or may be connected (e.g., networked) to other machines. The machine 800 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 800 capable of executing the instructions 824, sequentially or otherwise, that specify actions to be taken by that machine 800. Further, while only a single machine 800 is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light-emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible machine-readable storage medium) on which is stored the instructions 824 embodying any one or more of the methodologies or functions described herein. The instructions 824 may also reside, completely or at least partially, within the main memory 804, within the processor 802 (e.g., within a cache memory of the processor 802), or both, before or during execution thereof by the machine 800. Accordingly, the main memory 804 and the processor 802 may be considered machine-readable media 822 (e.g., tangible and non-transitory machine-readable media).

In some example embodiments, the machine 800 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 822 able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing instructions 824 for execution by a machine (e.g., machine 800), such that the instructions 824, when executed by one or more processors of the machine 800 (e.g., processor 802), cause the machine 800 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 822 is non-transitory in that it does not embody a propagating or transitory signal. However, labeling the machine-readable medium 822 as "non-transitory" should not be construed to mean that the medium is incapable of movement; the medium should be considered as being transportable from one physical location to another in some example embodiments. Additionally, since the machine-readable medium 822 is tangible, the medium may be considered a machine-readable device.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., Wi-Fi®, LTE®, and WiMAX™ networks). The term "transmission medium" shall be taken to include any intangible medium that is capable of storing, encoding, or carrying instructions for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 822 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
searching, using one or more hardware processors of a media content access system and over a communication network, according to a search order that prioritizes first content sources for which subscriptions are current over second content sources for which subscriptions are not current, media content sources for a media content item recorded to storage of a first media content device;
determining, by the one or more hardware processors, that the media content item is accessible for a second media device from a first media content source of the media content sources; and
based on the determination that the media content item is accessible for the second media device, providing information enabling the second media device to access the media content item from the first media content source.

2. The method of claim 1, wherein the media content sources comprise an over-the-top media content source and a television network.

3. The method of claim 1, wherein the information provided to the second media device comprises at least one of a channel identifier, a recording day, or a recording time.

4. The method of claim 1, wherein the information provided to the second media device comprises a uniform resource locator for the media content item.

5. The method of claim 1, wherein:
the information enabling the second media device to access the media content item at the first media content source comprises information identifying the first media content source.

6. The method of claim 5, wherein the information identifying the first media content source comprises a uniform resource locator (URL).

7. The method of claim 5, wherein the information identifying the first media content source comprises a television channel.

8. A media system comprising:
one or more hardware processors; and
a memory storing instructions that, when executed by at least one of the one or more hardware processors, causes the one or more hardware processors to perform operations comprising:
searching, over a communication network, according to a search order that prioritizes first content sources for which subscriptions are current over second content sources for which subscriptions are not current, media content sources for a media content item recorded to storage of a first media content device;
determining that the media content item is accessible for a second media device from a first media content source of the media content sources; and
based on the determination that the media content item is accessible for the second media device, providing information enabling the second media device to access the media content item from the first media content source.

9. The media system of claim 8, wherein the media content sources comprise an over-the-top media content source and a television network.

10. The media system of claim 8, wherein the information provided to the second media device comprises at least one of a channel identifier, a recording day, or a recording time.

11. The media system of claim 8, wherein the information provided to the second media device comprises a uniform resource locator (URL) for the media content item.

12. The media system of claim 8, wherein:
the information enabling the second media device to access the media content item at the first media content source comprises information identifying the first media content source.

13. The media system of claim 12, wherein the information identifying the first media content source comprises a uniform resource locator (URL).

14. A non-transitory computer-readable storage medium having stored thereon instructions that, when executed by one or more hardware processors of a machine, cause the one or more hardware processors to perform operations comprising:
searching, over a communication network, according to a search order that prioritizes first content sources for which subscriptions are current over second content sources for which subscriptions are not current, media content sources for a media content item recorded to storage of a first media content device;
determining that the media content item is accessible for a second media device from a first media content source of the media content sources; and
based on the determination that the media content item is accessible for the second media device, providing information enabling the second media device to access the media content item from the first media content source.

15. The computer-readable storage medium of claim 14, wherein the media content sources comprise an over-the-top media content source and a television network.

16. The non-transitory computer-readable storage medium of claim 14, wherein the information provided to the second media device comprises at least one of a channel identifier, a recording day, or a recording time.

17. The non-transitory computer-readable storage medium of claim 14, wherein the information provided to the second media device comprises a uniform resource locator (URL) for the media content item.

18. The non-transitory computer-readable storage medium of claim 14, wherein:
the information enabling the second media device to access the media content item at the first media content source comprises information identifying the first media content source.

19. The non-transitory computer-readable storage medium of claim 18, wherein the information identifying the first media content source comprises a uniform resource locator (URL).

20. The non-transitory computer-readable storage medium of claim 18, wherein the information identifying the first media content source comprises a television channel.

* * * * *